June 19, 1956   J. W. LEE   2,750,674
GLASS CUTTER
Filed Sept. 21, 1951   5 Sheets-Sheet 2
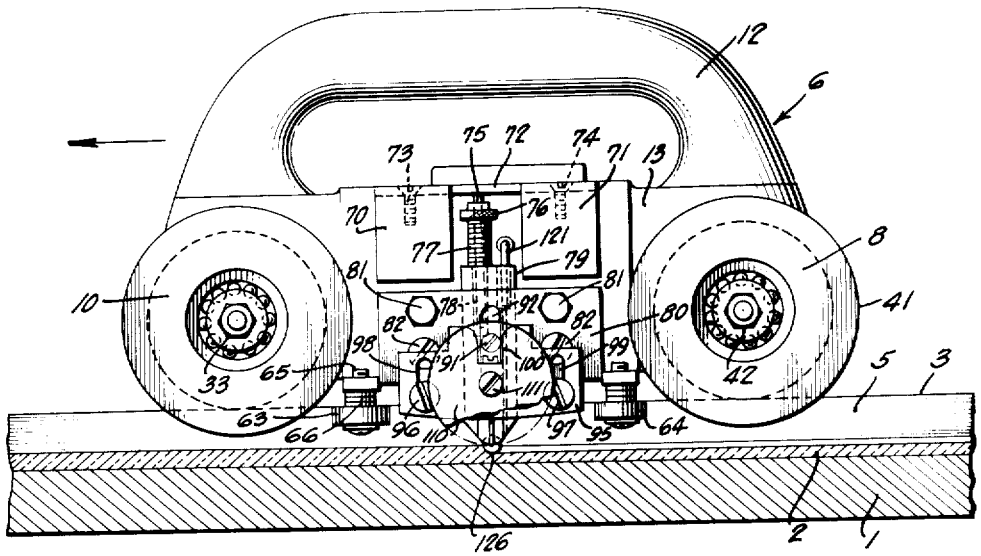
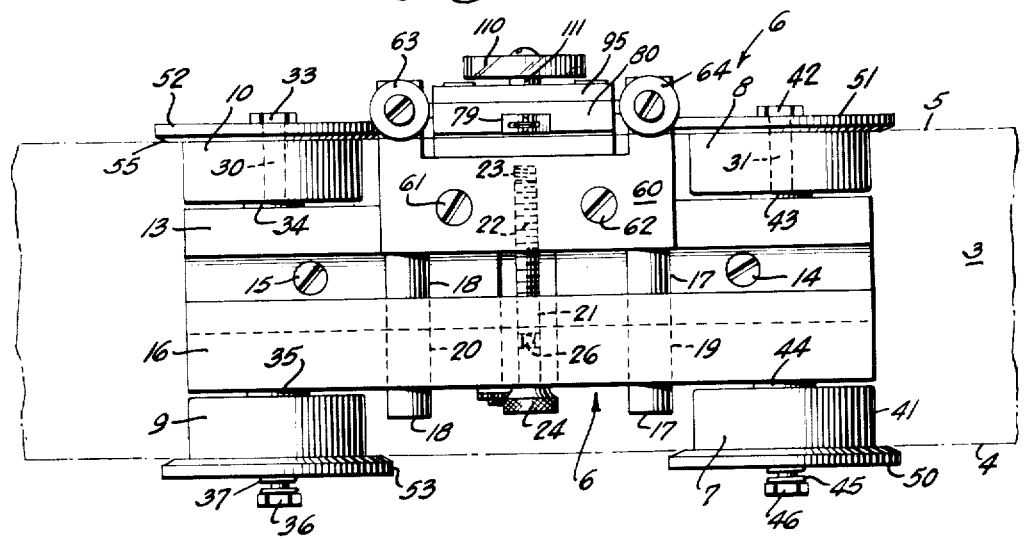
INVENTOR
JOHN W. LEE
BY   O. L. Spencer
ATTORNEY

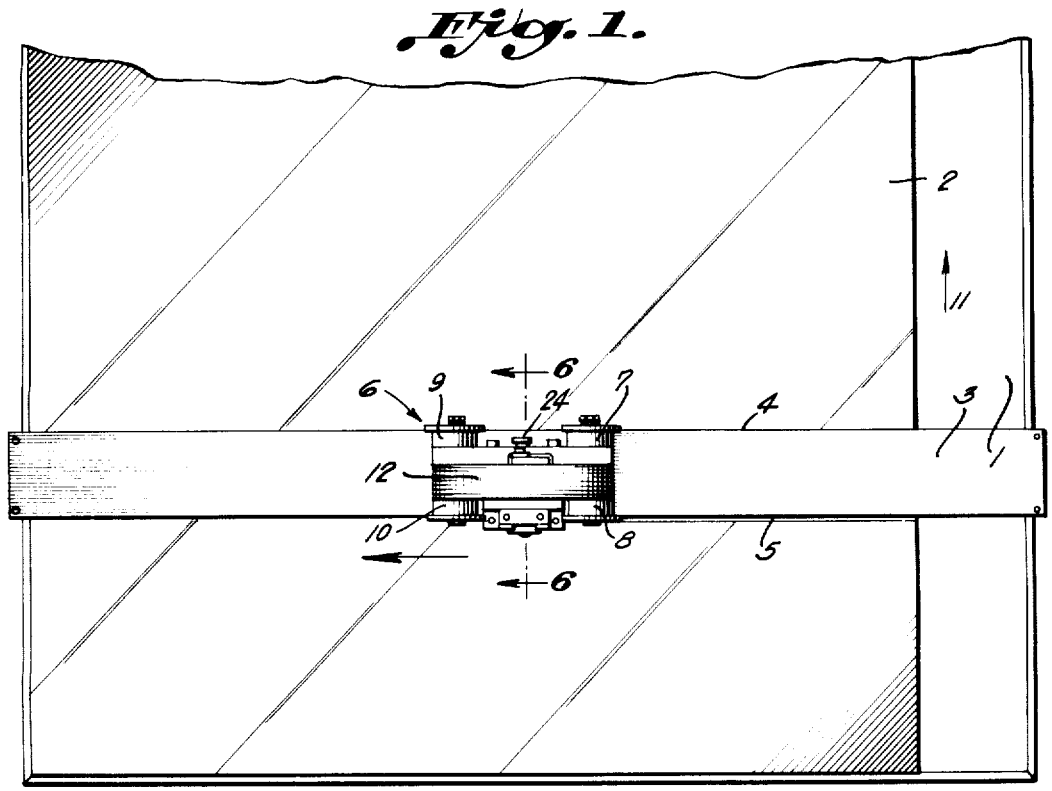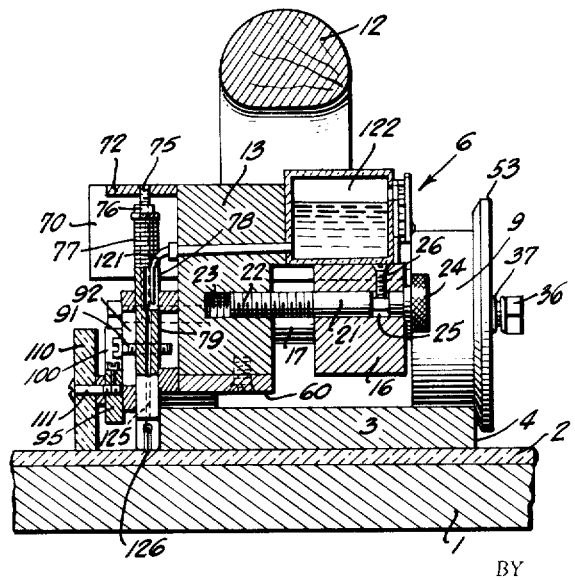

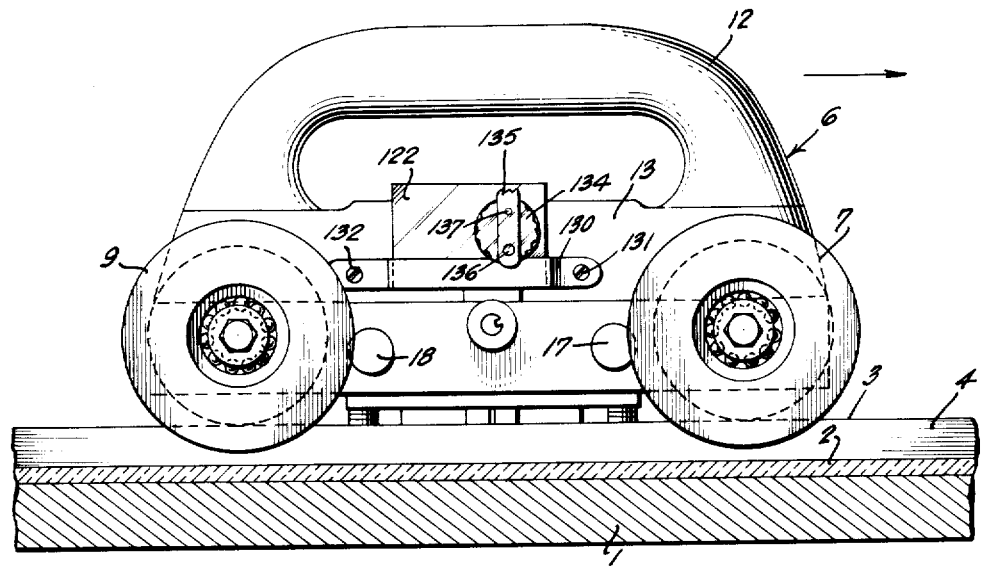
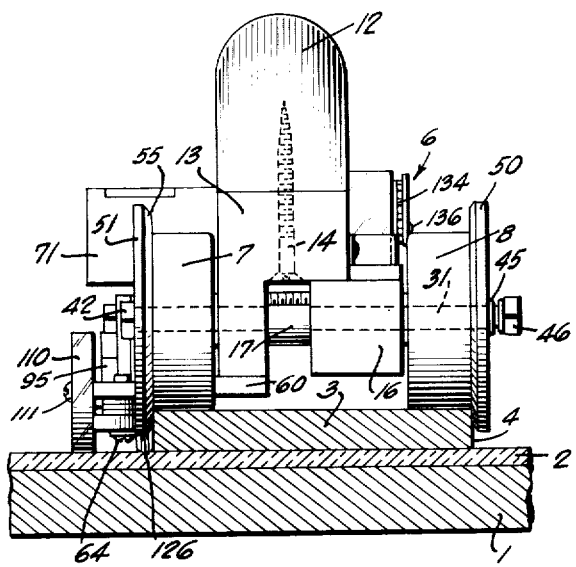

June 19, 1956  J. W. LEE  2,750,674
GLASS CUTTER
Filed Sept. 21, 1951  5 Sheets-Sheet 4
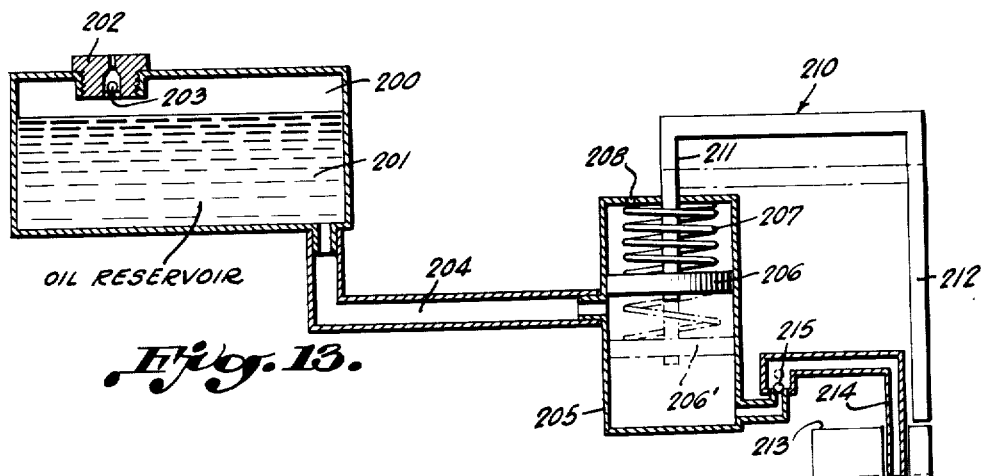
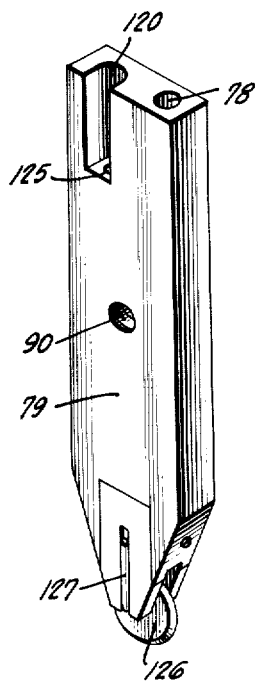
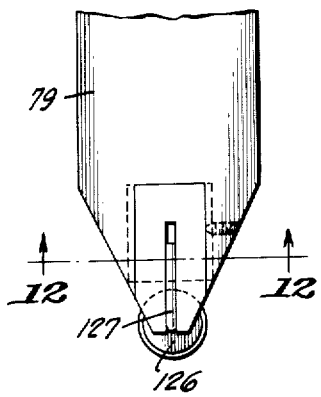
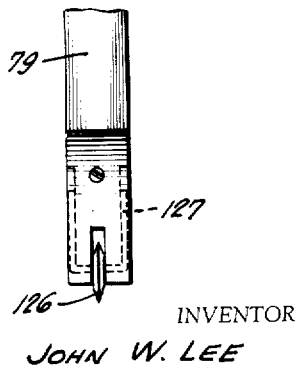
INVENTOR
JOHN W. LEE
BY O. L. Spencer
ATTORNEY

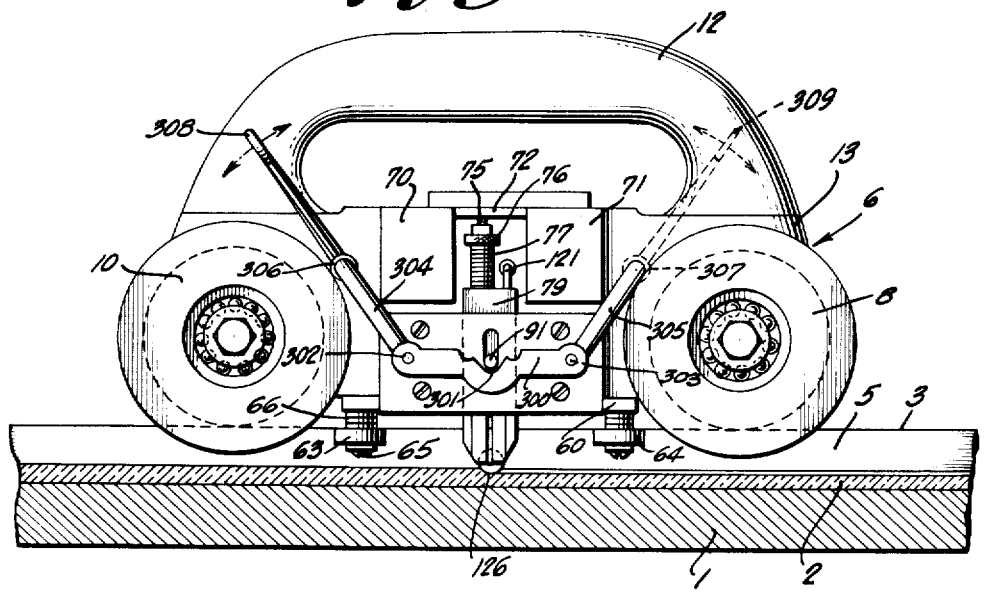

United States Patent Office 2,750,674
Patented June 19, 1956

2,750,674

GLASS CUTTER

John W. Lee, Festus, Mo., assignor to Pittsburgh Plate Glass Company, Allegheny County, Pa., a corporation of Pennsylvania Application September 21, 1951, Serial No. 247,645

3 Claims. (Cl. 33—32)

The present invention relates generally to scoring methods and devices and more particularly to methods and devices for scoring and cutting flat glass.

In the prior state of the art, it has been the practice to score or cut flat glass manually, by pressing a diamond or cutting wheel or other glass cutting tool against the glass and manually drawing the tool across the flat glass, continually applying suitable pressure to the tool and continually applying force in the direction of the cut, guiding the tool at each instant of time by means of a straight edge or the like. Accordingly, to cut a very large flat glass plate in the manner described requires considerable skill and care and is a relatively slow operation. Any fault in the cutting may result in cracks at the fault and consequent spoilage of the glass plate, with resultant considerable economic loss.

It is a primary object of the present invention to provide devices for scoring or cutting large glass plates more rapidly and accurately than has been the case hitherto.

Another object of the invention resides in the provision of a novel apparatus for cutting large flat glass rapidly and accurately by means of a short impulsive force applied to the apparatus, reliance being placed on the inertial mass of the apparatus to carry it across the glass, in response to the impulsive force.

It is still another object of the invention to provide a glass cutting structure which shall be accurately guidable, and adjustably secured to a guide rail for this purpose, during traverse of a glass plate without manual control and solely in response to an impulsive force.

Another object of the invention resides in the provision of a flat glass cutting tool which provides accurate and automatic control of the pressure of the tool against the glass during a cutting operation, the tool being automatically adjustable for cutting flat glass to various desired depths.

The above and still further objects, features and advantages of the invention will become apparent upon consideration of the following detailed description of specific embodiments thereof, especially when taken in conjunction with the accompanying drawings, wherein:

Figure 1 is a plan view of an apparatus in accordance with the present invention, in course of traverse across a flat glass during a cutting operation;

Figure 2 is a view in side elevation of the cutting apparatus of Figure 1;

Figure 3 is a plan view showing the underside of the apparatus illustrated in side elevation in Figure 2;

Figure 4 is a view in side elevation, showing the reverse side to that illustrated in Figure 2;

Figure 5 is an end view taken in elevation and viewed in the direction of the arrow in Figure 2;

Figure 6 is a sectional view taken on the lines 6—6 of Figure 1;

Figure 7 is a view in perspective of a detail of the embodiment of my invention illustrated in Figures 1 to 6;

Figure 8 shows in perspective a cutting tool and support therefor for use in the present invention;

Figure 9 is a further view in perspective of the cutting tool and support of Figure 8, as viewed from another angle;

Figure 10 is a view in side elevation of a portion of the cutting tool and support of Figures 8 and 9;

Figure 11 is an end view in elevation of the cutting tool and support of Figure 8 to 10 inclusive, fragmentarily illustrated;

Figure 12 is a sectional view taken on the lines 12—12 of Figure 10;

Figure 13 is a functional view of a system for feeding oil to a cutting support and tool of the type illustrated in Figures 8 to 12 inclusive;

Figure 14 shows a modification of the embodiment of my invention illustrated in Figures 1 to 12 inclusive, the primary distinctive feature of the embodiment of Figure 14 residing in the mode of raising and lowering the cutting tool;

Figure 15 is a view in transverse section of a portion of the cutter control mechanism of Figure 14;

Figure 16 shows in front elevation a guide wheel utilized in the present invention; and Figure 17 is a sectional view taken on the lines 17—17 of Figure 16.

Referring now more specifically to the accompanying drawings, the reference numeral 1 represents a work table, on which is placed an extensive sheet of glass which it is desired to cut transversely of the sheet. In accordance with the present invention a guide rail 3 is provided superimposed on the glass plate 2, which is of relatively slight thickness, and considerable width and which possesses straight edges 4 and 5. Riding on the rail 3 is a cutting tool carrier generally indicated by the reference numeral 6, provided with two pairs of wheels 7, 8 and 9, 10, each pair straddling the guide-rail 3, so that the carrier 6 presents a four-wheeled vehicle for a cutting tool. The carrier 6 is arranged to be relatively heavy, and the wheel pairs 7, 8 and 9, 11 are arranged to be accurately guided by the rail 3, without wobble or tilting, by virtue of the construction of the wheels and the weight of the carrier 6. In operation, the carrier 6 is positioned adjacent one edge of the glass plate 2, and then subjected to a relatively strong impulsive force. The carrier 6 then travels across the rail 3, guided solely by the rail 3, and solely in response to the impulsive force, cutting the glass as it moves. By selection of the weight of the carrier 6 and by adequately reducing friction in the system, the carrier 6 may be caused to move completely across the glass plate 2 by reason of its own inertia, in response to a single force impulse.

Following the steps above outlined, it has been proven possible to cut a glass plate very accurately and also very quickly since the workman performing the cutting operation need only position the straight edge 3 and then impulsively move the carrier 6, in one quick motion. It is not necessary for the workman manually to guide the carrier 6 across the glass plate nor to lean over the table 1, nor to move physically across the glass plate even when the glass plate is of very considerable size.

Where an extremely long glass plate must be cut into segments, cuts being taken in a direction of the arrow 11 in Figure 1, two workmen may stand one on each side of the table 1, and these workmen may relay the carrier 6 each to the other, in taking successive cuts, and it has been found that by proceeding in this manner a time saving of as much as 75% may be accomplished, in comparison with the time required to perform the same operations by the prior art methods known to me.

Proceeding now to a detailed description of a specific embodiment of a cutting tool carrier, constructed in accordance with the invention, the reference numeral 12 identifies a handle shaped for convenient grasping by the hand of the workman, and to this end generally of U-shape, the legs of the U extending vertically downward. The handle 12 is secured to a metal block 13 by means of extended bolts 14, 15, extending vertically upward into the legs of the handle 12.

The block 13 is of generally L-shaped transverse cross-section, with the base of the L vertically upward. In the hollow of the L is mounted a further block 16 into which extend, in a direction transverse of the carrier 6, a pair of relatively longitudinally displaced cylindrical pins 17, 18. The pins 17, 18 extend through the further block 16 via bearing apertures 19, 20 provided therein, and the bearing apertures 19, 20 are slidable on pins 17, 18 to enable transverse adjustment of the block 16.

Transverse adjustment of the block 16 is accomplished by means of a bolt 21, having a threaded end 22, extending within a threaded transverse aperture 23 in the block 13, so that rotation of the bolt 21 effects transverse motion thereof. The bolt 21 further extends entirely through an unthreaded aperture in the block 16 and externally of the block 16 is provided with knurled head 24, whereby the bolt 21 may be conveniently manually rotated. Bolt 21 is provided with an annular keyway 25 at a position internally of the block 16, and a screw or pin 26 is provided which extends into the keyway 25. The dimensions of the keyway 25 are such with respect to the dimensions of the screw or pin 26 that transverse relative motion of the bolt 21 and the block 16 is impossible and accordingly motion of the bolt 21 transversely of the block 13, in response to turning of the knurled head 24, results in corresponding transverse motion of the block 16.

Extending completley through blocks 13 and 16 are a pair of wheel shafts 30 and 31. Mounted on either end of the shaft 30 are the guide wheels 9 and 10. The wheel 10 may be maintained at a fixed position on the shaft 30 by means of a nut 33, secured to a threaded end of the wheel shaft 30. The wheel 10 may be spaced with respect to the block 13 by means of a spacing washer 34. The wheel 9 may be spaced from the block 6 by means of a washer 35, and may be mantained in contact with the washer 35 by means of a nut 36 secured to a threaded end of the shaft 30, and spaced from the outer face of the wheel 9 by means of a compression spring 37. Accordingly the compression spring 37 serves to maintain wheels 9, 10 continually in contact with the washers 34, 35 and upon relative transverse adjustment of the blocks 13, 16 the spring 37 provides play for the wheels 9, 10. Accordingly the relative spacings of the wheels 9, 10 may be adjusted by turning the knurled nut 24 and thereby varying the transverse spacing of the blocks 13 and 16. In a similar fashion, the wheels 7 and 8 are provided on the shaft 31, the wheel 8 being fixedly maintained with respect to the shaft 31 by means of a nut 42 and fixedly spaced from the block 13 by a washer 43. The wheel 7 may be fixedly maintained with respect to the block 16 by a washer 44, and may be continually pressed into contact with washer 44 by compression spring 45, despite variations in relative positions of the blocks 13, 16 due to rotation of the knurled head 24.

The wheels 7, 8, 9, 10 ride on the upper surface of the guide rail 3, during motion of the carrier 6 in a cutting operation. The wheels 7 to 10, inclusive, are provided respectively with flanges 50, 51, 52 and 53 outwardly of the wheels, and overlapping the edges 4, 5 of the rail 3, to provide lateral guidance for the cutter carrier 6. It is, of course, essential that the carrier 6 follow the guide rail 3 precisely and yet without undue friction. Unless precise guidance is provided the cut in the flat glass will not be straight but if undue friction is present the carrier 6 will come to a stop before completing a traverse of the flat glass plate in response to an impulsive force. During long continued service of the device, the guide rail 3 will wear to some extent, as will the wheels 7, 8, 9, 10 and the flanges 50, 51, 52, 53 so that means for taking up the play resulting from the wear must be provided. Adjustment of the nuts 36 and 46 adjusts the compression of the compression springs 37 and 45, and thereby adjusts the frictional force existing between the flanges 50, 51, 52 and 53 and the edges 4, 5 of the guide rail 3. The knurled head 24 provides for initial adjustment of the spacings of the wheels 7, 8 and of the wheels 9, 10.

The flanges 50, 51, 52, 53 are provided respectively with gently curving edges as 55 in the case of the wheel 10 so that the flanges 50 are at their narrowest at their outer edges, and gradually thicken in proceeding toward the center. The spacings of the wheels 7, 8 and 9, 10 is initially adjusted by turning the knurled head 24 so that the spacing between the internal faces of the flanges 50, 51 and 52, 53 is very slightly less than the width of the rail 3, and as the carrier is placed on the rail 3 a wedging action occurs, by virtue of the curvature of the flanges as at 55, slightly separating the wheels 32, 33 and compressing the spring 39. Thereby, after the carrier has been forced into position on the rail 3, the springs 37, 45 maintain pressure of the flanges 50, 51 and 52, 53 against the edges 4 and 5 of the rail 3. This pressure may be adjusted by adjustment of the nuts 36, 46, and by adjustment of the knurled head 24, until the frictional forces present are insufficient to stop the inertial motion of the carrier 6, during a traverse of the glass plate 2. Nevertheless, the pressure between the flanges and the rail 3 is sufficiently great to assure extremely accurate guidance of the carrier 6.

Secured to the under side of the block 13 is a U-shape bracket plate 60, horizontally disposed, and having a base portion 60 secured to the block 13 by means of screws 61, 62. The legs of the U-shape bracket extend forwardly of the wheels 8 and 10 and serve to support auxiliary guide wheels 63 and 64 which rotate about vertical axes. The guide wheel 63 is secured to the one arm of the bracket 60 by means of a bolt 65 extending vertically upward through the arm and the wheel 63 is spaced from the arm by means of a spring 66. A similar construction is followed with respect to the wheel 64, and consequently further specific description of the latter may be dispensed with. The vertical level of the wheels 63, 64 is such that they ride on one edge 5 of the rail 3 where they provide supplementary guidance for the carrier 6. Accordingly, the rail 3 is gripped not only between the wheel pairs 7, 8 and 9, 10 but also between the auxiliary wheels 63, 64 and the wheels 7, 9, and adjustment of the knurled head 24 results in adjustment of the pressure between the latter named sets of wheels.

Extending forwardly of the block 13, as viewed in Figure 2 of the accompanying drawings, is a pair of metallic supports 70, 71 across the top of which is provided a horizontal plate 72, secured to the extensions 70, 71 by means of a pair of bolts 73, 74. Depending from the horizontal plate 72 is a rod 75, which is threaded for a portion of its length adjacent to the under side of the plate 72. Threadedly engaging the threaded portion of the rod 75 is a traveling nut 76, and surrounding the rod 75 under the nut 76 is a compression spring 77. The rod 75 extends downwardly into a vertical aperture 78 in a cutting wheel holder 79, the fit being sufficiently loose to permit vertical movement of the cutting wheel holder 79 on the rod 75. The compression spring 77 bears on the upper end of the cutting tool holder 79 and serves to force the latter downward. Adjustment of the nut 76 serves to vary the compression of the spring 77, and accordingly the force with which the cutting tool holder 79 is pressed vertically downward.

The cutting tool holder 79 is further guided by means of a slotted bracket 80, of generally rectangular shape, which is secured against the block 13 by means of bolts 81 and screws 82, and the fit between the cutting tool holder 79 and the slot in the bracket 80 is sufficiently loose to enable movement of the holder.

A transverse threaded aperture 90 is provided in the cutting tool holder 79 into which extends a guide bolt 91, and a slot 92 is provided in the bracket 80, to enable vertical movement of the bolt 91 with the tool holder 79. The elongated aperture 92 accordingly provides some additional guidance for the tool holder 79, and its ends provide stops to limit motion of the tool holder 79, vertically both to an upward and a downward limit. Forwardly of the plate 80, as seen in Figure 2, is provided a further plate 95 which is guided in vertical movement with respect to the block 13, by means of two transverse bolts 96, 97, extending through slots 98, 99 in the plate. An additional vertical open-ended slot 100 is provided which provides clearance for the head of the bolt 91 and the bottom wall 101 of the open ended slot 100 serving, when the plate 95 is raised, to impinge on the head of the bolt 91 and to raise the latter, consequently raising the tool holder 79. Further secured to the plate is a plastic wheel 110, which is free to rotate on a pin 111, secured irrotatably to the plate. The under edge of the plate 95 is gently curved, as at 105 (see Figure 7) so that the outer edges of the plate 95 are at a slightly higher level than is the center. At the same time the width of the plate 95 is considerably longer than the diameter of the wheel 110 and the diameter of the wheel is at least twice the width of the tool holder.

It follows that the spring 77, which tends to move the tool holder 79 vertically downwards, also tends to move the wheel 110 and the bracket 95 vertically downwards, by virtue of the contact between the head of the bolt 91 and the base 101 of the open ended slot 100. When the carrier is placed on the rail 3 preparatory to making a cut in a flat glass plate, and is moved toward the flat glass plate, the curved under wall 105 of the bracket 95 rides up on the glass plate until an edge of the wheel 110 is in contact with the edge of the glass plate. Thereafter the wheel 110 rolls up on the glass plate 2, carrying up with it the tool holder 79, until the wheel rides on the surface of the plate 2. At this time the tool holder is in position to make a cut and the tool is pressed into the glass by the spring 77. The adjustment of the tension of the spring 77 then serves to determine the force with which the cutting tool impinges on the glass plate and consequently the depth of the cut which will be made.

The tool holder, per se, as illustrated in Figures 8 to 12 inclusive includes a vertical slot 120, which is adequate to accommodate an oil delivery tube 121 for all positions of the block 13. The oil delivery tube 121 communicates with an oil reservoir 122 and the slot 120 communicates with a vertical passageway 125 which terminates adjacent to the cutting wheel 126. The latter is of conventional character and is held within a slot in the tool holder 79 by means of a spring bracket 127, which is per se conventional. The vertical passageway 125 serves to convey oil to a point adjacent the wheel 126, and serves therefor to lubricate the latter. The oil reservoir 122 is retained in position with respect to the block 13 by means of a bracket 130 which is secured to the block 13 by means of bolts 131, 132. The knurled member 134 serves to cover an opening to the reservoir 122, whereby it may be filled and the vertical rod 135 is pivoted at 136 and serves to uncover a small aperture 137 through which air may arrive in the reservoir 122 to replace oil which drains out. When the aperture 135 is covered the oil cannot flow from the reservoir 122 and thereby an adequate control of oil flow is assured.

The system of oil feed shown in the embodiment of my invention illustrated in Figures 1–12 inclusive is solely a gravity feed, and control of oil flow is solely effective in terms of permitting and preventing oil leakage by permitting and preventing access of air to the oil reservoir.

In Figure 13 of the accompanying drawings I have illustrated a modified oil flow system which provides for the flow of oil only at the initiation of a cut, and for the flow of oil in metered quantities for each oiling operation.

Referring now more specifically to Figure 13 of the accompanying drawings, the reference numeral 200 represents an oil reservoir filled with oil 201 and possessing an opening closed normally by a plug 202, through which oil may be supplied to the reservoir, the plug 202 having a one-way valve 203 for preventing spillage of oil, and which is per se conventional. Oil from the reservoir 200 flows through a passage 204, in the form of a pipe, to a metering cylinder 205. Internally of the metering cylinder 205 is a piston 206 which is spring pressed downwardly by a coiled helical compression spring 207. In its uppermost position the piston 206 permits access of oil from the conduit 204 to the lower portion of the metering cylinder 205. An air inlet 208 is provided for the upper part of the metering device 205. Connected to the piston 206 is a generally J shaped member 210, the shorter arm 211 of the J extending vertically from the piston 206 and secured thereto, and the longer arm 212 extending vertically downward to a position substantially in contact with the upper end of the tool holder 79. The compression spring 207, in forcing the piston 206 downwardly, maintains contact between the longer arm 212 of the J-shaped member and the upper surface 213 of the tool holder 79 during motion of the tool holder 79 either vertically upward or downward. Upon upward movement of the tool holder 79 oil is admitted into the metering cylinder 205 underneath the piston 206, and upon dropping of the tool holder 79 the piston 206 exerts pressure on the upper surface of the oil in the metering chamber 205. A passage is provided from adjacent the bottom of the metering chamber 205 to a conduit 214, which communicates with the slot 120 in the tool holder 79. A check valve 215 is provided in the conduit 214 which permits flow of oil into the conduit 214, but prevents reverse flow, and which tends to prevent flow of oil except in response to pressure applied by the piston 206.

Referring to Figure 14 of the accompanying drawings, there is shown a structure which is essentially similar to that of Figures 1 to 12 inclusive, but wherein a modified mode of raising and lowering the tool holder 79 is provided. In the system of Figure 14 the head of the bolt 91 is supported on a substantially horizontal member 300 having a slight depression 301 for engaging the head of the bolt 91. The horizontal member 300 is secured at each end by means of pins 302, 303 to crank members 304, 305 having pivot points at 306, 307. The cranks are actuable by manual members 308, 309 depression of either of which toward the rail 3 serves to raise the member 300 and consequently the pin 91 and the tool holder 79. The distinction between the system of Figure 14 and the system of Figures 1 to 12 inclusive, will be apparent that in Figure 14 a positive manual operation is required to raise the tool holder 79, after which the entire carrier may be placed on a glass plate, guided by the rail 3, and thereafter the tool holder lowered into cutting position. As in the system of Figures 1 to 12 inclusive, the coil spring 77 which is adjustable in response to turning of the traveling nut 76, serves to determine the pressure with which the cutting wheel 126 will press against the glass plate 2. In the system of Figures 1 to 12, on the other hand, the raising of the tool holder is automatic.

Reference is now made to Figures 16 and 17 of the accompanying drawings, wherein is shown a modified form of guide wheels, corresponding with wheels 7 to 10 inclusive. In the wheel of Figures 16 and 17 there is provided a rubber tire 320, on the circumference of the wheel, which is sufficiently resilient and of such size that the wheels continue to ride on the rail 3 despite the fact that the tire 320 is in contact with the glass plate 1. In this manner the weight of the carrier is distributed partly to the rail 3, and partly to the glass 1, which has been found to result in a smoother traverse of the carrier across the glass in response to a smaller impulsive force. Further, there is substantially smaller chance of accidental impact of a metallic wheel rim against a flat glass plate with consequent breakage when rubber tired wheels instead of all metal wheels are employed.

While I have described various specific and preferred embodiments of my invention, it will be apparent that various modifications of the specific structure disclosed may be resorted to, both in arrangement and in detail, without departing from the true spirit of my invention, as defined in the appended claims.

Having thus described the invention, what is claimed is:

1. A glass cutting machine arranged for movement longitudinally of a single guide rail and for complete transverse and vertical guidance by said single guide rail, comprising a main body, a supplementary body movable transversely with respect to said main body, means for adjusting the relative transverse spacing of said main body and said supplementary body, a pair of wheel shafts extending transversely through said bodies, a pair of wheels on each of said wheel shafts, and means for holding said wheels in fixed transverse positions with respect to said main and supplementary bodies during adjustment of said transverse spacing.

2. A glass cutting machine comprising a main body arranged for longitudinal motion along a guide rail, a glass cutting tool holder secured for vertical motion with respect to said main body, a cutting tool held by said tool holder, a guide wheel fixedly secured to said tool holder and movable vertically therewith, said guide wheel having a diameter of the order of at least twice the width of said tool holder, and having a lowermost point at approximately the same level as the cutting edge of said cutting tool.

3. A glass cutting machine comprising a main body arranged for longitudinal motion along a guide rail supported on a sheet of glass, a glass cutting tool holder secured for vertical motion only with respect to said main body, a cutting tool secured by said tool holder, spring means normally pressing said tool holder vertically downward, a stop for limiting the downward motion of said tool holder, and vertically slidable means for automatically raising said tool holder to cutting position upon approach of said cutting tool to an edge of said sheet of glass, said last mentioned means comprising a first device operative to raise said cutting tool to a first predetermined level on initial approach to said edge of said sheet of glass, and a second device for completing raising of said tool holder on further approach to said edge of said sheet of glass.

References Cited in the file of this patent

UNITED STATES PATENTS

| | | |
|---|---|---|
| 1,681,091 | Bryant | Aug. 14, 1928 |
| 1,945,730 | Christman | Feb. 6, 1934 |
| 2,091,332 | Owen | Aug. 31, 1937 |
| 2,375,378 | Morris | May 8, 1945 |

FOREIGN PATENTS

| | | |
|---|---|---|
| 523,573 | Great Britain | July 17, 1940 |

Dedication 2,750,674.—*John W. Lee*, Festus, Mo. GLASS CUTTER. Patent dated June 19, 1956. Dedication filed July 25, 1973, by the assignee, *PPG Industries, Inc.*

Hereby dedicates for the remainder of its term to the free use and benefit of the People of the United States.

[*Official Gazette January 8, 1974.*]